United States Patent
Grund et al.

(10) Patent No.: US 6,998,160 B2
(45) Date of Patent: *Feb. 14, 2006

(54) FIVE-LAYERED, BIAXIALLY-ORIENTED, SEALABLE TUBULAR FILM FOR THE PACKAGING AND WRAPPING OF PASTE-LIKE FOODSTUFFS MEAT AND MEAT WITH BONES AND USE THEREOF

(75) Inventors: Hartmut Grund, Otterstadt (DE); Horst Lang, Weinheim (DE); Helmut Schauer, Mannheim (DE)

(73) Assignee: Naturin GmbH & Co., Weinheim (DE)

( * ) Notice: Subject to any disclaimer, the term of this patent is extended or adjusted under 35 U.S.C. 154(b) by 102 days.

This patent is subject to a terminal disclaimer.

(21) Appl. No.: 10/466,773

(22) PCT Filed: Feb. 1, 2001

(86) PCT No.: PCT/EP01/01068

§ 371 (c)(1),
(2), (4) Date: Aug. 1, 2003

(87) PCT Pub. No.: WO02/060267

PCT Pub. Date: Aug. 8, 2002

(65) Prior Publication Data

US 2004/0052911 A1 Mar. 18, 2004

(51) Int. Cl.
*B32B 1/08* (2006.01)
*A21D 6/00* (2006.01)
*A24F 27/00* (2006.01)

(52) U.S. Cl. .................. 428/35.9; 428/36.91; 426/497; 426/524.1; 206/105; 206/129

(58) Field of Classification Search .............. 428/34.9, 428/35.9, 36.9, 36.91; 206/497, 524.1; 426/105, 426/106, 127, 129

See application file for complete search history.

(56) References Cited

FOREIGN PATENT DOCUMENTS

| | | |
|---|---|---|
| DE | 43 39 337 | 5/1995 |
| EP | 0 288 972 | 11/1988 |
| EP | 0 530 549 | 3/1993 |
| EP | 0 685 310 | 6/1995 |
| EP | 0 974 452 | 1/2000 |
| EP | 0 980 752 | 2/2000 |
| EP | 0 981 963 | 3/2000 |
| GB | 2 316 906 | 3/1998 |
| WO | 97 12758 | 4/1997 |

OTHER PUBLICATIONS

U.S. Appl. No. 10/466,774, filed Aug. 1, 2003, Grund et al.
U.S. Appl. No. 10/466,772, filed Aug. 1, 2003, Grund et al.
U.S. Appl. No. 10/466,773, filed Aug. 1, 2003, Grund et al.
U.S. Appl. No. 10/470,904, filed Aug. 1, 2003, Grund et al.
U.S. Appl. No. 10/470,920, filed Aug. 1, 2003, Grund et al.

Primary Examiner—Donald J. Loney
(74) Attorney, Agent, or Firm—Oblon, Spivak, McClelland, Maier & Neustadt, P.C.

(57) ABSTRACT

The invention relates to a five-layered, biaxially oriented, shrinkable, sealable tubular film for the packaging and wrapping of paste-like foodstuffs, meat, or meat with bones and to the use thereof. The tubular film of the invention has an inner layer comprised of at least one copolyamide and at least one modified polyolefin, a layer of a modified polyolefin, a middle layer comprised of at least one homopolyamide and/or at lest one copolyamide and/or at least one copolymer of ethylene and vinyl alcohol and/or a modified polyolefin, a layer of at least one ethylene-vinyl alcohol copolymer, and an outer layer comprised of at least one polyolefin and/or at least one modified polyolefin. Such tubular films involve a significant improvement in the seal seam strength, in particular at low sealing temperatures, a high impermeability to oxygen and a comparable to markedly higher resistance to puncturing compared to prior art films.

41 Claims, No Drawings

FIVE-LAYERED, BIAXIALLY-ORIENTED, SEALABLE TUBULAR FILM FOR THE PACKAGING AND WRAPPING OF PASTE-LIKE FOODSTUFFS MEAT AND MEAT WITH BONES AND USE THEREOF

BACKGROUND OF THE INVENTION

1. The Field of the Invention

The invention relates to a five-layered, biaxially oriented, shrinkable, sealable tubular film with improved oxygen barrier and to its use for the packaging and wrapping of paste-like foodstuffs, meat, and meat with bones.

2. Description of the Background

A five-layered, polyamide-based tubular film for packaging and wrapping pasty foodstuffs, especially a sausage skin, is already known from DE 43 39 337 C2. This tubular film is comprised of an inner layer and an outer layer made of the same polyamide material, a middle polyolefin layer and two adhesion-promoting layers made of the same material and situated between the inner layer and middle layer and between the middle layer and outer layer. The inner and outer layers consist of at least one aliphatic polyamide and/or at least one aliphatic copolyamide and at least one partially aromatic polyamide and/or at least one partially aromatic copolyamide, the amount of partially aromatic polyamide and/or copolyamide being from 5 to 60 wt.-%, relative to the total weight of the polymer mixture of partially aromatic and aliphatic polyamides and copolyamides. Such a tubular film, produced by coextrusion, is provided with controlled shrinkability by biaxial stretching and heat-setting. With respect to its technological properties important to wrapping and packaging of meat, especially meat with bones, such a tubular film requires some improvements. In the event of meat with bones there is a risk of protruding bones piercing the packaging film following shrinking of the packaging film on the packaged item, because the puncture resistance is insufficient. Furthermore, such tubular films for packaging and wrapping meat or meat with bones and pasty foodstuffs should also allow sealing by simple heat-sealing. With bags produced using such tubular films, the strength of the seal seam is a crucial issue. For example, when a piece of ham or meat drops out of a spout and into a bag made of a plastic film and sealed at its bottom by a heat-seal seam, considerable loads—depending on the weight—arise due to the product to be packaged dropping into the bag, possibly giving rise to tearing of the heat-seal seam and complete opening of the bag at the bottom thereof. Also, the heat-seal seam is exposed to extreme load during subsequent vacuum treatment and shrinking of the bags. Likewise, shipment and storage of the filled bags involve high demands on the puncture resistance of the film and on the seal seam strength.

SUMMARY OF THE INVENTION

The object of the present invention is therefore to provide a biaxially oriented, shrinkable, sealable tubular film for the packaging and wrapping of pasty foodstuffs, meat, and meat with bones which, in addition to the requirements to be met by such a packaging film, such as low water vapor and oxygen permeabilities, firstly has high puncture resistance of the tubular film and secondly high strength of the seal seam.

DETAILED DESCRIPTION OF THE PREFERRED EMBODIMENTS

Another object of the invention is to further improve the packaging film with respect to its impermeability to oxygen.

According to the invention, said object is accomplished by means of a five-layered, biaxially oriented, shrinkable, sealable tubular film having the characterizing features of claim 1.

The inner layer includes at least one sealable copolyamide. These per se known copolyamides are produced from monomers selected from the group of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine, and xylylenediamine. The wall thickness of the inner layer is between 5 and 16 μm.

Surprisingly, addition of an amorphous polyamide and/or of a homopolyamide and/or of a modified polyolefin to a copolyamide in the inner layer significantly increases the strength of the seal seam compared to pure copolyamide, and high seal seam strength is achieved even at low sealing temperatures. Consequently, the film of the invention presents considerable technological advantages.

Polyamides having a glass transition temperature between 50 and 200° C. in dry state are used as amorphous polyamides for the inner layer. Examples are polyamide 6I/6T, polyamide 6-3-T and polyamide 6I.

Polyamides which can be produced from the same monomers as the copolyamides described above are used as homopolyamides for the inner layer. The homopolyamides can be both aliphatic and partially aromatic in character.

The modified polyolefins are copolymers of ethylene or propylene and optionally other linear α-olefins having from 3 to 8 C atoms and α,β-unsaturated carboxylic acids, preferably acrylic acid, methacrylic acid and/or metal salts and/or alkyl esters thereof, or appropriate graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof. Furthermore, the modified polyolefins can be modified homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, or anhydrides, esters, amides or imides thereof grafted thereon.

The major component of the inner layer is a sealable copolyamide or a mixture of sealable copolyamides, said major component being present in amounts of between 50 and 95 wt.-%. Each of the other components, amorphous polyamide and/or homopolyamide and/or modified polyolefin, can be admixed to the major component in amounts of from 1 to 30 wt.-%, preferably from 5 to 25 wt.-%, relative to the overall inner layer.

The layer of modified polyolefin is comprised of copolymers of ethylene or propylene and optionally other linear α-olefins having from 3 to 8 C atoms and α,β-unsaturated carboxylic acids, preferably acrylic acid, methacrylic acid and/or metal salts and/or alkyl esters thereof, or appropriate graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof. Furthermore, the modified polyolefins can be modified homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, or anhydrides, esters, amides or imides thereof grafted thereon. The wall thickness of the modified polyolefin layer is between 5 and 30 μm.

In addition, the oxygen impermeability of the film is dramatically improved by an oxygen barrier layer comprised of an ethylene-vinyl alcohol copolymer, situated between the outer layer and middle layer, and by using a polyamide-based middle layer.

A layer comprised of at least one homopolyamide and/or at least one copolyamide and/or at least one copolymer of ethylene and vinyl alcohol and/or a modified polyolefin is used as middle layer in the wrapping according to the invention. The wall thickness wall of this layer is between 10 and 35 μm.

Suitable homo- and copolyamides are well-known and can be produced from the corresponding monomers such as caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine, and xylylenediamine.

Preferred homo- and copolyamides are polyamide 6, polyamide 12, polyamide 610, polyamide 612, polyamide MXD6, polyamide 6/66, polyamide 6/12, polyamide 6I/6T.

The modified polyolefins which can be included in the middle layer are copolymers of ethylene or propylene and optionally other linear α-olefins having from 3 to 8 C atoms and α,β-unsaturated carboxylic acids, preferably acrylic acid, methacrylic acid and/or metal salts and/or alkyl esters thereof, or appropriate graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof. Furthermore, the modified polyolefins can be modified homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, ylic acids, preferably maleic acid, fumaric acid, itaconic acid, or anhydrides, esters, amides or imides thereof grafted thereon.

The copolymers of ethylene and vinyl alcohol which can be included in the middle layer are produced by complete saponification of copolymers of ethylene and vinyl acetate. In general, the amount of ethylene in the ethylene-vinyl alcohol copolymers is between 27 and 48 mole-%. For addition to the middle layer, ethylene-vinyl alcohol copolymers are preferred wherein the amount of ethylene is between 27 and 38 mole-%.

The major component of the middle layer is comprised of homopolyamides, alone or in mixture, copolyamides, alone or in mixture, or of mixtures of homo- and copolyamides, said major component being present in amounts of between 50 and 100 wt.-%. Where additional components such as copolymers of ethylene and vinyl alcohol and/or modified polyolefins are present, each one is admixed to the major component in amounts of from 0 to 50 wt.-%, relative to the overall middle layer.

Next, a layer of an ethylene-vinyl alcohol copolymer is provided, comprised of the same copolymers which can be included in the middle layer, but in this case, the preferred amount of ethylene is between 34 and 48 mole-%. The ethylene-vinyl alcohol copolymers of this layer can be added with homo- or copolyamides and/or modified polyethylenes. The wall thickness of this layer is between 3 and 10 μm.

Suitable homo- and copolyamides are well-known and can be produced from the corresponding monomers such as caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine, and xylylenediamine.

Preferred homo- and copolyamides are polyamide 6, polyamide 12, polyamide 610, polyamide 612, polyamide MXD6, polyamide 6/66, polyamide 6/12, polyamide 6I/6T.

The modified polyolefins are copolymers of ethylene or propylene and optionally other linear α-olefins having from 3 to 8 C atoms and α,β-unsaturated carboxylic acids, preferably acrylic acid, methacrylic acid and/or metal salts and/or alkyl esters thereof, or appropriate graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof. Furthermore, the modified polyolefins can be modified homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, or anhydrides, esters, amides or imides thereof grafted thereon.

The major component of this layer is an ethylene-vinyl alcohol copolymer in an amount of from 60 to 100 wt.-%. Where additional components such as homo- and copolyamides and modified polyolefins are present, each one is admixed to the major component in amounts of from 0 to 40 wt.-%, relative to the overall layer.

The outer layer consists of polyolefins or of modified polyolefins. Arbitrary mixtures of these components can also be used as outer layer. The wall thickness of this layer is between 3 and 15 μm.

Homopolymers of ethylene or propylene and/or copolymers of linear α-olefins having from 2 to 8 C atoms are preferably used as polyolefins. Linear low-density polyethylene, high-density polyethylene, polypropylene homopolymer, polypropylene block copolymer and polypropylene random copolymer are preferably used for the middle layer.

The modified polyolefins are copolymers of ethylene or propylene and optionally other linear α-olefins having from 3 to 8 C atoms and α,β-unsaturated carboxylic acids, preferably acrylic acid, methacrylic acid and/or metal salts and/or alkyl esters thereof, or appropriate graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof. Furthermore, the modified polyolefins can be modified homo- or copolymers of ethylene and/or propylene and optionally other linear α-olefins having from 3 to 8 C atoms, which have monomers from the group of α,β-unsaturated dicarboxylic acids, preferably maleic acid, fumaric acid, itaconic acid, or anhydrides, esters, amides or imides thereof grafted thereon.

In addition, conventional auxiliary agents such as anti-blocking agents, stabilizers, antistatic agents or lubricants can be included in the tubular film. These auxiliary agents are normally added in amounts of from 0.1 to 5 wt.-%. Furthermore, the film can be colored by adding pigments or pigment mixtures.

The tubular films of the invention are produced by coextrusion wherein the individual polymers for the separate layers are plastified and homogenized in five extruders, and the five melt streams, according to the desired single wall thickness ratios, are subsequently extruded through a five-layer extrusion head to form a primary tube and subjected to biaxial stretching and heat-setting.

The tubular films of the invention have an overall wall thickness of from 30 to 100 µm, preferably from 40 to 80 µm.

Surprisingly, the tubular films of the invention are clearly superior to the tubular films of DE 43 39 337 C2 with respect to seal seam strength, puncture resistance and oxygen permeability.

To determine the seal seam strength, each tubular film was welded inside at a right angle to the machine direction, using an SGPE 20 laboratory welding apparatus from W. Kopp Verpackungsmaschinen. Strips 25 mm in width were taken from the welded tubular films in such a way that the welding seam was at a right angle to the length of the strip. The strip samples were stretched on a tensile testing machine from Instron Company at a stretching rate of 500 mm/min until breaking of the weld seam occurred. The resulting maximum force will be referred to as seal seam strength hereinafter.

As a measure for the puncture resistance, the damaging energy is determined in a penetration test.

The damaging energy was determined following DIN 53373, but deviating from said DIN standard, a hardened cylindrical form A pin 3 mm in diameter, according to DIN EN 28 734, was used as impact body and the testing rate was 500 mm/min. The damaging energy is the energy that is absorbed until initial tearing of the sample occurs.

The oxygen permeability was determined according to ASTM D3985-81(88) at 23° C. and 50% relative humidity, using an OXTRAN 200-H from Modern Controls Inc.

The tubular film according to DE 43 39 337 C2 (Comparative Example 1) could not be welded at sealing temperatures of 140 and 200° C., while the tubular films of the invention achieved satisfactory to good seal seam strength already at a sealing temperature of 140° C. At a sealing temperature of 200° C., the tubular films of the invention exhibit seal seam strengths which are at least 18% higher than those of the Comparative Examples.

The tubular films according to the invention exhibit comparable to significantly higher damaging energy values in the penetration test as well.

The invention will be illustrated in more detail with reference to the following examples.

EXAMPLE 1

The individual polymers for the separate layers were plastified and homogenized in five extruders. According to the desired single wall thickness ratios, the five melt streams were fed into a five-layer extrusion head, formed into a primary tube and subjected to biaxial stretching and heat-setting. The primary tube had a diameter of 45.5 mm and a mean overall wall thickness of 0.50 mm. It was heated to 116° C. using infrared radiation and stretched at a surface stretch ratio of 9.2. The biaxially stretched tube was heat-set, flattened, and wound up. The mean overall wall thickness of the tube was 55 µm, and the flat width was 210 mm.

The layers of the final tube consisted of the following polymers, with a single wall thickness as indicated:

| | |
|---|---|
| 1st layer (outer layer): | Blend of 40% polyethylene (LDPE), Lupolen 1804H from BASF AG and 60% modified polyethylene, Admer NF 478 E from Mitsui Chemicals Inc., 6 µm |
| 2nd layer: | Ethylene-vinyl alcohol copolymer, Soarnol AT4406 from Nippon Gohsei, 6 µm |
| 3rd layer: | Polyamide 6/12, Grilon CR9 from EMS Chemie, 22 µm |
| 4th layer: | Adhesion promotor, modified polyethylene, Admer NF 478 E from Mitsui Chemicals Inc., 11 µm |
| 5th layer (inner layer): | Blend of 90% polyamide 6/12, Grilon CF6S from EMS Chemie and 10% polyamide 12, UBE Nylon 3030 B from UBE Industries Ltd., 10 µm |

The following seal seam strength values were determined:

| | |
|---|---|
| Sealing temperature 140° C.: | 8 N/25 mm |
| Sealing temperature 200° C.: | 94 N/25 mm |

The damaging energy was 560 mJ.
The oxygen permeability was 6.0 cm$^3$/m$^2$ dbars.

EXAMPLE 2

The individual polymers for the separate layers were plastified and homogenized in five extruders. According to the desired single wall thickness ratios, the five melt streams were fed into a five-layer extrusion head, formed into a primary tube and subjected to biaxial stretching and heat-setting. The primary tube had a diameter of 45.5 mm and a mean overall wall thickness of 0.53 mm. It was heated to 108° C. using infrared radiation and stretched at a surface stretch ratio of 9.7. The biaxially stretched tube was heat-set, flattened, and wound up. The mean overall wall thickness of the tube was 55 µm, and the flat width was 208 mm.

The layers of the final tube consisted of the following polymers, with a single wall thickness as indicated:

| | |
|---|---|
| 1st layer (outer layer): | Blend of 40% polyethylene (LDPE), Lupolen 1804H from BASF AG and 60% modified polyethylene, Admer NF 478 E from Mitsui Chemicals Inc., 6 µm |
| 2nd layer: | Ethylene-vinyl alcohol copolymer, Soarnol AT4406 from Nippon Gohsei, 6 µm |
| 3rd layer: | Blend of 40% polyamide 6, Grilon F40 from EMS Chemie and 50% polyamide 6/66, Ultramid C35 from BASF AG, and 10% polyamide 6I/6T, Grivory G21 from EMS Chemie, 21 µm |
| 4th layer: | Adhesion promotor, modified polyethylene, Admer NF 478 E from Mitsui Chemicals Inc., 12 µm |
| 5th layer (inner layer): | Blend of 90% polyamide 6/12, Grilon CF6S from EMS Chemie and 10% ionomer resin, Surlyn 1652 from Du Pont de Nemours GmbH, 10 µm |

The following seal seam strength values were determined:

| | |
|---|---|
| Sealing temperature 140° C.: | 73 N/25 mm |
| Sealing temperature 200° C.: | 94 N/25 mm |

The damaging energy was 585 mJ.
The oxygen permeability was 5.2 cm$^3$/m$^2$ dbars.

EXAMPLE 3

The individual polymers for the separate layers were plastified and homogenized in five extruders. According to the desired single wall thickness ratios, the five melt streams were fed into a five-layer extrusion head, formed into a primary tube and subjected to biaxial stretching and heat-setting. The primary tube had a diameter of 45.5 mm and a mean overall wall thickness of 0.52 mm. It was heated to 115° C. using infrared radiation and stretched at a surface stretch ratio of 9.4. The biaxially stretched tube was heat-set, flattened, and wound up. The mean overall wall thickness of the tube was 55 µm, and the flat width was 211 mm.

The layers of the final tube consisted of the following polymers, with a single wall thickness as indicated:

| | |
|---|---|
| 1st layer (outer layer): | Blend of 40% polyethylene (LDPE), Lupolen 1804H from BASF AG and 60% modified polyethylene, Admer NF 478 E from Mitsui Chemicals Inc., 6 µm |
| 2nd layer: | Ethylene-vinyl alcohol copolymer, Soarnol AT4406 from Nippon Gohsei, 6 µm |
| 3rd layer: | Polyamide 6, Grilon F40 from EMS Chemie, 21 µm |
| 4th layer: | Adhesion promotor, modified polyethylene, Admer NF 478 E from Mitsui Chemicals Inc., 12 µm |
| 5th layer (inner layer): | Blend of 85% polyamide 6/12, Grilon CF6S from EMS Chemie and 5% polyamide 6I/6T, Grivory G21 from EMS Chemie and 10% ionomer resin, Surlyn 1652 from Du Pont de Nemours GmbH, 10 µm |

The following seal seam strength values were determined:

| | |
|---|---|
| Sealing temperature 140° C.: | 13 N/25 mm |
| Sealing temperature 200° C.: | 97 N/25 mm |

The damaging energy was 530 mJ.
The oxygen permeability was 6.1 cm$^3$/m$^2$ dbars.

COMPARATIVE EXAMPLE 1

A five-layered tubular film with the following structure was produced according to DE 43 39 337 C2:

| | |
|---|---|
| 1st layer (outer layer): | Blend of 95% polyamide 6, Durethan B40 F from Bayer AG and 5% polyamide 6I/6T, Grivory G21 from EMS Chemie, 21 µm |
| 2nd layer: | Adhesion promotor, modified polyethylene, Admer NF 478 E from Mitsui Chemicals Inc., 5 µm |
| 3rd layer: | Polyethylene (LLDPE), Dowlex 2049 E from DOW Chemical Company, 15 µm |
| 4th layer: | Adhesion promotor (as in layer 2), 5 µm |
| 5th layer (inner layer): | Blend of 95% polyamide 6, Durethan B40 F from Bayer AG and 5% polyamide 6I/6T, Grivory G21 from EMS Chemie, 9 µm |

The following seal seam strength values were determined:

| | |
|---|---|
| Sealing temperature 140° C.: | no welding |
| Sealing temperature 200° C.: | no welding |

The damaging energy was 345 mJ.
The oxygen permeability was 20 cm$^3$/m$^2$ dbars.

COMPARATIVE EXAMPLE 2

A five layer tubular film was produced as in Example 3, with the exception that the fifth layer (inner layer) consisted of pure polymamide 6/12, Grilon CF6S from EMS Chemie.

The following seal seam strength values were determined:

| | |
|---|---|
| Sealing temperature 140° C.: | 34 N/25 mm |
| Sealing temperature 200° C.: | 80 N/25 mm |

The damaging energy was 528 mJ.
The oxygen permeability was 6.0 cm$^3$/m$^2$ dbars.

The invention claimed is:

1. A five-layered, biaxially oriented, shrinkable, sealable tubular film for the packaging and wrapping of paste-like foodstuffs, meat, or meat with bones, wherein the tubular film comprises:
   an inner layer comprised of at least one copolyamide and a polymer material selected from the group consisting of at least one amorphous polyamide, at least one homopolyamide, at least one modified polyolefin and mixtures thereof,
   a layer comprising a modified polyolefin,
   a middle layer comprised of a polymer material selected from the group consisting of at least one homopolyamide, at least one copolyamide, at least one copolymer of ethylene and vinyl alcohol, a modified polyolefin and mixtures thereof,
   a layer comprised of at least one ethylene-vinyl alcohol copolymer, and
   an outer layer comprised of at least one polyolefin, at least one modified polyolefin or a combination thereof.

2. The tubular film according to claim 1, wherein the inner layer comprises copolyamides produced from monomers selected from the group consisting of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine and xylylenediamine.

3. The tubular film according to claim 2, wherein the inner layer comprises at least one copolyamide which is present in an amount ranging from 50 to 95 wt %.

4. The tubular film according to claim 1, wherein the inner layer comprises at least one amorphous polyamide having a glass transition temperature ranging from 50 to 200° C. in a dry state.

5. The tubular film according to claim 4, wherein the glass transition temperature of the amorphous polyamide ranges from 90 to 160° C.

6. The tubular film according to claim 1, wherein the inner layer comprises homopolyamides produced from monomers selected from the group consisting of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine and xylylenediamine.

7. The tubular film according to claim 1, wherein the inner layers comprise at least one modified polyolefin, which is a copolymer of ethylene or propylene and optionally other linear α-olefins having from 3 to 8 C atoms and α,β-unsaturated carboxylic acids and/or metal salts and/or alkyl esters thereof, or graft copolymers of the above mentioned monomers on polyolefins, or partially saponified ethylene-vinyl acetate copolymers which are optionally graft-polymerized with an α,β-unsaturated carboxylic acid and have a low saponification level, or mixtures thereof.

8. The tubular film according to claim 1, wherein each of the amorphous polyamide, homopolyamide and modified polyolefin in the inner layer, is present in amounts ranging from 0 to 30 wt % relative to the total weight of the inner layer.

9. The tubular film according to claim 1, wherein the layer adjacent to the inner layer comprises a modified polyolefin or a mixture of modified polyolefins.

10. The tubular film according to claim 9, wherein the modified polyolefins are modified homo- or co-polymers of ethylene, propylene or combinations thereof and optionally other linear α-olefins having from 3 to 8 C atoms, which have monomers selected from the group consisting of α,β-unsaturated carboxylic acids or anhydrides, esters, amides or imides thereof grafted thereon.

11. The tubular film according to claim 9, wherein the modified polyolefins are copolymers of ethylene, propylene or combinations thereof and optionally other linear α-olefins having from 3 to 8 C atoms and α,β-unsaturated carboxylic acids, metal salts thereof, alkyl esters thereof or mixtures thereof, or graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof.

12. The tubular film according to claim 1, wherein the middle layer comprises at least one homopolyamide and/or at least one copolyamide produced from monomers selected from the group consisting of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine and xylylenediamine.

13. The tubular film according to claim 12, wherein the middle layer further comprises at least one modified polyolefin produced by copolymerization of ethylene or propylene and optionally other linear α-olefins having from 3 to 8 C atoms and α,β-unsaturated carboxylic acids, metal salts thereof, alkyl esters thereof or mixtures thereof, or graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof.

14. The tubular film according to claim 12, wherein the middle layer further comprises a copolymer of ethylene vinyl alcohol, and the amount of ethylene in the ethylene vinyl alcohol copolymer ranges from 27 to 48 mole %.

15. The tubular film according to claim 12, wherein the amount of the modified polyolefin and/or the ethylene vinyl alcohol copolymer ranges from 0 to 50 wt %, relative to the total weight of the middle layer.

16. The tubular film according to claim 1, wherein a layer comprised of at least one ethylene-vinyl alcohol copolymer is disposed between the middle layer and the outer layer.

17. The tubular film according to claim 16, wherein the amount of ethylene in said ethylene vinyl alcohol copolymer ranges from 27 to 48 mole %.

18. The tubular film according to claim 16, wherein the layer between the middle layer and outer layer further comprises homopolyamides, copolyamides, modified polyolefins or mixtures thereof.

19. The tubular film according to claim 18, wherein the homo- and copolyamides are produced from monomers selected from the group consisting of caprolactam, laurinlactam, ω-aminoundecanoic acid, adipic acid, azelaic acid, sebacic acid, decanedicarboxylic acid, dodecanedicarboxylic acid, terephthalic acid, isophthalic acid, tetramethylenediamine, pentamethylenediamine, hexamethylenediamine, octamethylenediamine and xylylenediamine.

20. The tubular film according to claim 18, wherein the modified polyolefins are produced by co-polymerization of ethylene or propylene and optionally other linear α-olefins having from 3 to 8 C atoms and α,β-unsaturated carboxylic acids, metal salts thereof, alkyl esters thereof or mixtures thereof, or graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof.

21. The tubular film according to claim 18, wherein the amount of homopolyamide, copolyamide, modified polyolefin or mixtures thereof in the layer disposed between the middle and outer layer ranges from 0 to 40 wt %, relative to the total weight of the layer.

22. The tubular film according to claim 1, wherein the outer layer comprises at least one polyolefin, at least one modified polyolefin or mixtures thereof.

23. The tubular film according to claim 22, wherein the outer layer comprises at least one polyolefin selected from the group consisting of linear low-density polyethylene, high density polyethylene, polypropylene homopolymers, poly-propylene block copolymers and polypropylene random co-polymers.

24. The tubular film according to claim 22, wherein the outer layer comprises at least one modified polyolefin produced by co-polymerization of ethylene or propylene and optionally other linear α-olefins having from 3 to 8 C atoms and α,β-unsaturated carboxylic acids, metal salts thereof, alkyl esters thereof or mixtures thereof, or graft copolymers of the above-mentioned monomers on polyolefins, or partially saponified ethylene-vinyl acetate copolymers which are optionally graft-polymerized with an α,β-unsaturated carboxylic acid and have a low saponification level, or mixtures thereof.

25. The tubular film according to claim 22, wherein the modified polyolefins of the outer layer are modified homo- or co-polymers of ethylene, propylene or combinations thereof and optionally other linear α-olefins having from 3 to 8 C atoms, which have monomers selected from the group consisting of α,β-unsaturated carboxylic acids or anhydrides, esters, amides or imides thereof grafted thereon.

26. The tubular film according to claim 1, wherein the tubular film comprises a coextruded and biaxially stretched tubular film which has been subjected to heat-setting.

27. The tubular film according to claim 1, wherein the wall thickness thereof ranges from 30 to 100 μm.

28. A package for paste-like foodstuffs, meat, or meat with bones comprising the tubular film according to claim 1.

29. A bag comprising the tubular film according to claim 1 prepared by welding or sealing the inner layer on itself.

30. Paste-like foodstuffs, meat, or meat with bones packaged in a bag according to claim 29.

31. The tubular film according to claim 7, wherein the α,β-unsaturated carboxylic acids are acrylic acid, methacrylic acid or combinations thereof.

32. The tubular film according to claim 8, wherein each of the amorphous polyamide, homopolyamide and modified polyolefin in the inner layer, is present in amounts ranging from 5 to 25 wt %, relative to the total weight of the inner layer.

33. The tubular film according to claim 10, wherein the α,β-unsaturated carboxylic acids are selected from the group consisting of maleic acid, fumaric acid, and itaconic acid.

34. The tubular film according to claim 11, wherein the α,β-unsaturated carboxylic acids are acrylic acid, methacrylic acid or mixtures thereof.

35. The tubular film according to claim 13, wherein the α,β-unsaturated carboxylic acids are acrylic acid, methacrylic acid or mixtures thereof.

36. The tubular film according to claim 14, wherein the amount of ethylene vinyl alcohol copolymer ranges from 27 to 38 mole %.

37. The tubular film according to claim 17, wherein the amount of ethylene/vinyl alcohol copolymer ranges from 34 to 48 mole %.

38. The tubular film according to claim 20, wherein the α,β-unsaturated carboxylic acids are acrylic acid, methacrylic acid or mixtures thereof.

39. The tubular film according to claim 24, wherein the α,β-unsaturated carboxylic acids are acrylic acid, methacrylic acid or mixtures thereof.

40. The tubular film according to claim 25, wherein the α,β-unsaturated carboxylic acids are selected from the group consisting of maleic acid, fumaric acid, and itaconic acid.

41. The tubular film according to claim 1, wherein the wall thickness thereof ranges from 40 to 80 μm.

* * * * *